US011692466B2

(12) United States Patent
Tomescu et al.

(10) Patent No.: US 11,692,466 B2
(45) Date of Patent: Jul. 4, 2023

(54) MACHINE HAVING A LIQUID LUBRICATION SYSTEM AND A SHAFT

(71) Applicant: PRATT & WHITNEY CANADA CORP., Longueuil (CA)

(72) Inventors: Dana Tomescu, Brampton (CA); Daniel Alecu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 950 days.

(21) Appl. No.: 16/426,876

(22) Filed: May 30, 2019

(65) Prior Publication Data

US 2020/0378281 A1 Dec. 3, 2020

(51) Int. Cl.
*H02K 1/32* (2006.01)
*H02K 7/00* (2006.01)
(Continued)

(52) U.S. Cl.
CPC .............. *F01M 1/02* (2013.01); *B64D 33/08* (2013.01); *F01M 11/03* (2013.01); *F04B 29/00* (2013.01); *F16C 33/6659* (2013.01); *F16N 13/20* (2013.01); *F16N 39/06* (2013.01); *H02K 1/32* (2013.01); *H02K 7/003* (2013.01); *H02K 7/085* (2013.01); *H02K 7/1823* (2013.01); *H02K 9/19* (2013.01); *H02K 9/26* (2013.01); *F01M 2001/0238* (2013.01);
(Continued)

(58) Field of Classification Search
CPC .. F04C 18/16; F01M 2001/0238; F01M 1/02; F01M 11/03; F01M 1/08; F16N 13/20; F16N 39/06; F16N 2013/205; F16N 2210/08; F16N 2210/16; F16N 2210/02; F16N 2210/14; B64D 33/08; F04B 29/00; F04B 19/12; F04B 53/18; F16C 33/6659; F16C 33/1045; F16C 2208/32; F16C 2360/23; F16C 3/02; F16C 17/02; F16C 33/201; H02K 1/32; H02K 7/003; H02K 7/085; H02K 7/1823; H02K 9/19; H02K 9/26
See application file for complete search history.

(56) References Cited

U.S. PATENT DOCUMENTS 3,795,386 A * 3/1974 Carter .................... F16J 15/406
366/76.1
5,291,089 A * 3/1994 Snider .................. H02K 5/1675
310/90
(Continued)

FOREIGN PATENT DOCUMENTS

CN 106762668 A * 5/2017 ............ F04C 29/047

*Primary Examiner* — Thomas Truong
(74) *Attorney, Agent, or Firm* — Norton Rose Fulbright Canada LLP.

(57) ABSTRACT

A machine includes a liquid lubrication system and a shaft, the shaft being rotatable about a rotation axis, the shaft including a first part, a second part engaged coaxially with the first part, and a journal bearing between the first part and the second part, the first part being rotatable relative to the second part about the rotation axis, a helical feature disposed between the first part and the second part and configured to define a helical pump between the first part and the second part, the pump being hydraulically connected to the liquid lubrication system, the journal bearing being disposed adjacent to the helical feature.

17 Claims, 10 Drawing Sheets

(51) Int. Cl.

| | |
|---|---|
| *F01M 1/02* | (2006.01) |
| *F16N 13/20* | (2006.01) |
| *F16N 39/06* | (2006.01) |
| *F04B 37/00* | (2006.01) |
| *B64D 33/08* | (2006.01) |
| *H02K 7/08* | (2006.01) |
| *H02K 9/19* | (2006.01) |
| *H02K 9/26* | (2006.01) |
| *H02K 7/18* | (2006.01) |
| *F16C 33/66* | (2006.01) |
| *F01M 11/03* | (2006.01) |

(52) U.S. Cl.
CPC .... *F16N 2013/205* (2013.01); *F16N 2210/08* (2013.01); *F16N 2210/16* (2013.01)

(56) References Cited

U.S. PATENT DOCUMENTS

| | | | |
|---|---|---|---|
| 5,662,463 A | 9/1997 | Mirzoev et al. | |
| 5,713,670 A * | 2/1998 | Goldowsky | H02K 33/16 |
| | | | 384/115 |
| 6,544,020 B1 * | 4/2003 | Bahnen | F04C 18/16 |
| | | | 418/94 |
| 6,966,746 B2 | 11/2005 | Cardenas et al. | |
| 8,257,063 B2 | 9/2012 | Sato et al. | |
| 8,760,014 B2 | 6/2014 | Birdi | |
| 9,148,041 B2 | 9/2015 | Knoblauch | |
| 10,859,143 B2 * | 12/2020 | Chung | F16H 25/20 |
| 2018/0351434 A1 | 12/2018 | Knoblauch et al. | |

* cited by examiner

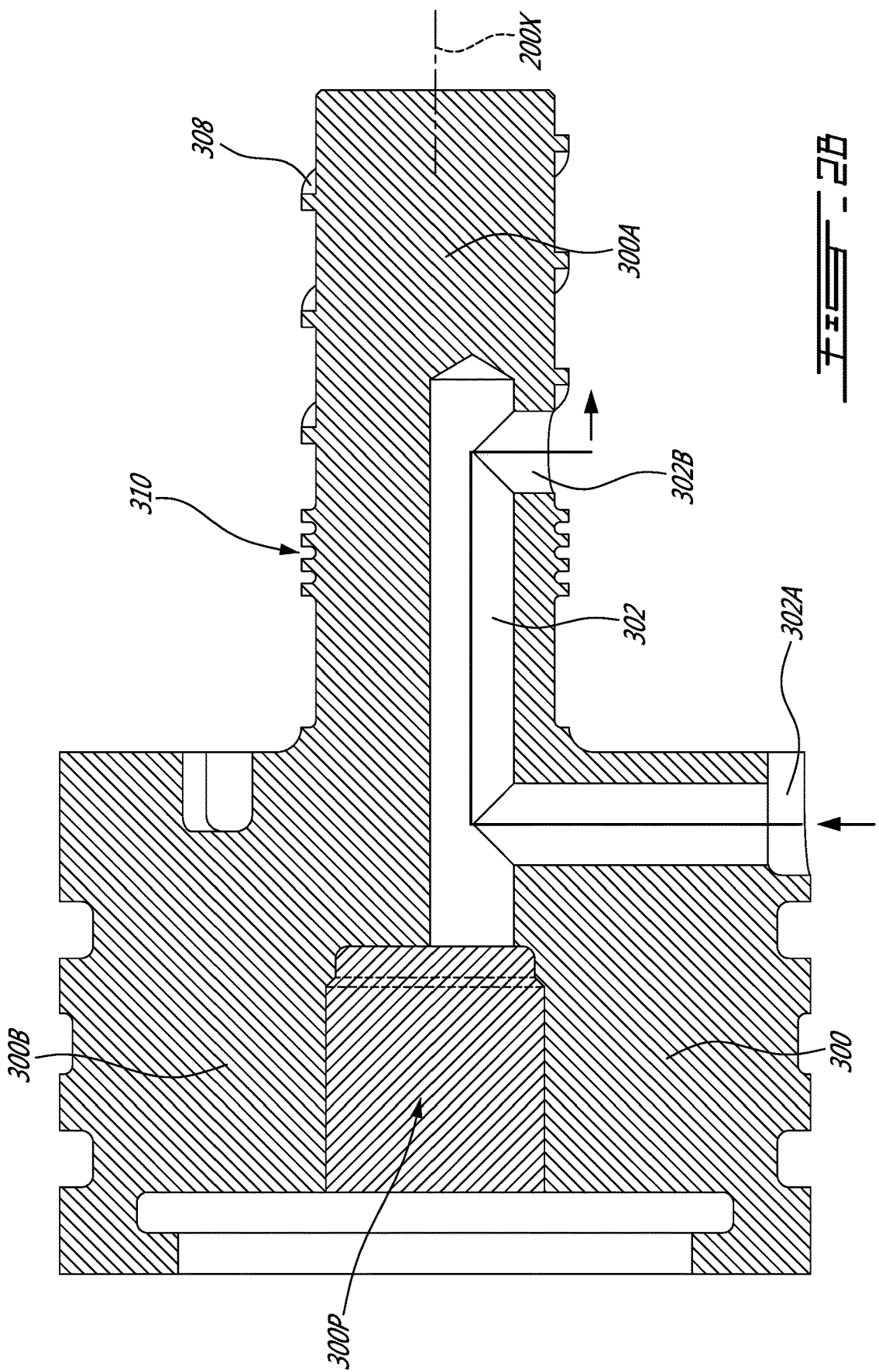

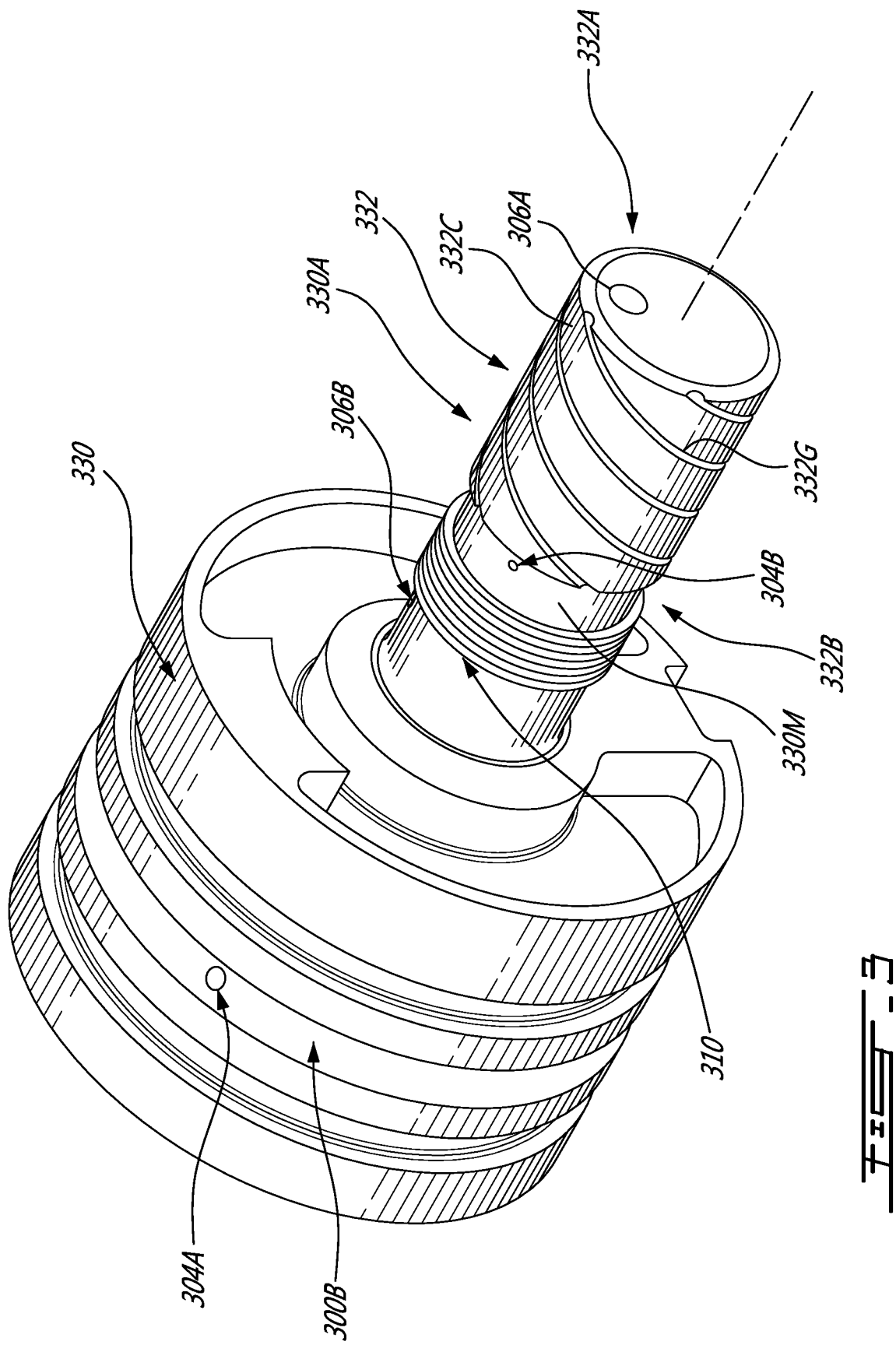

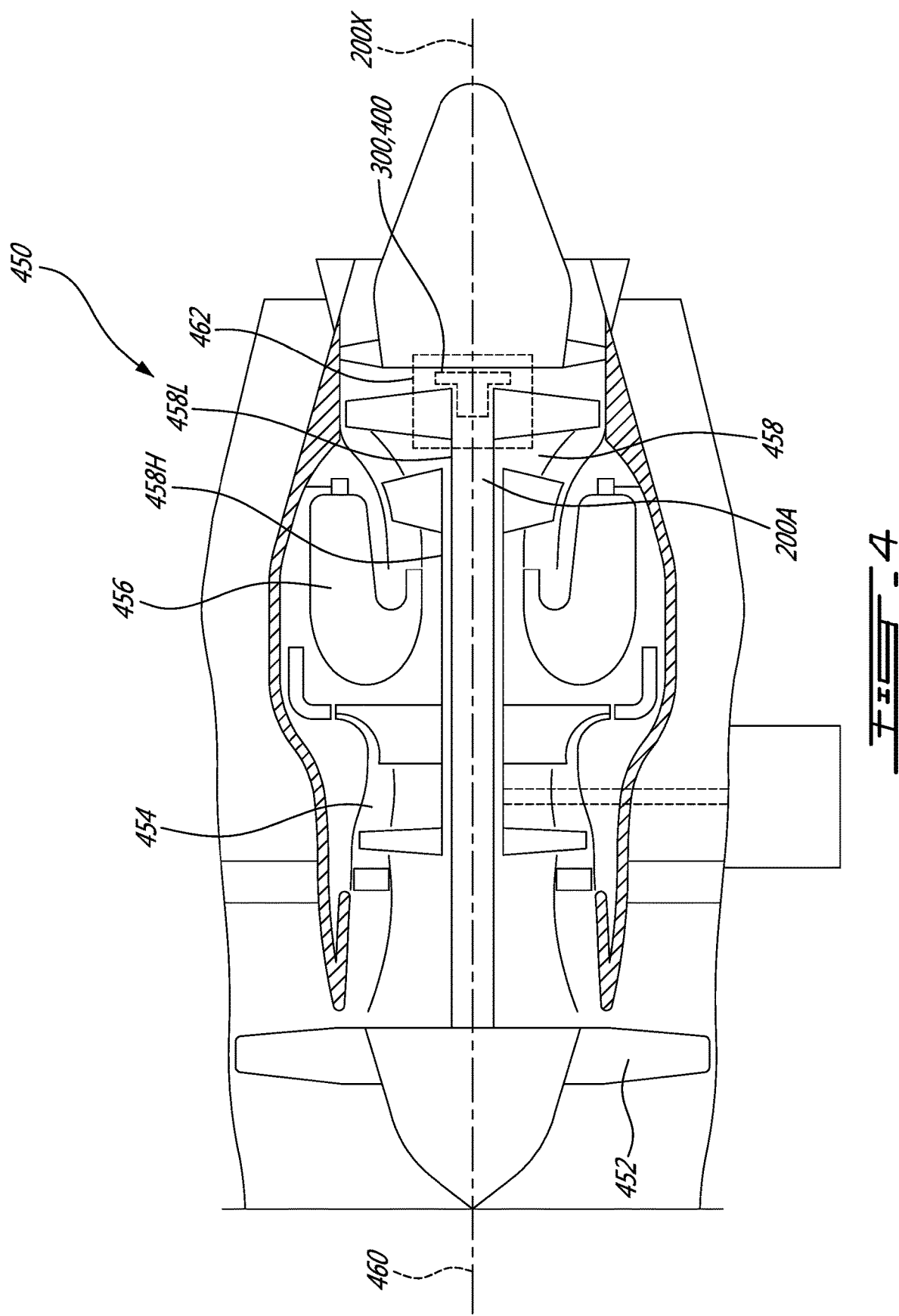

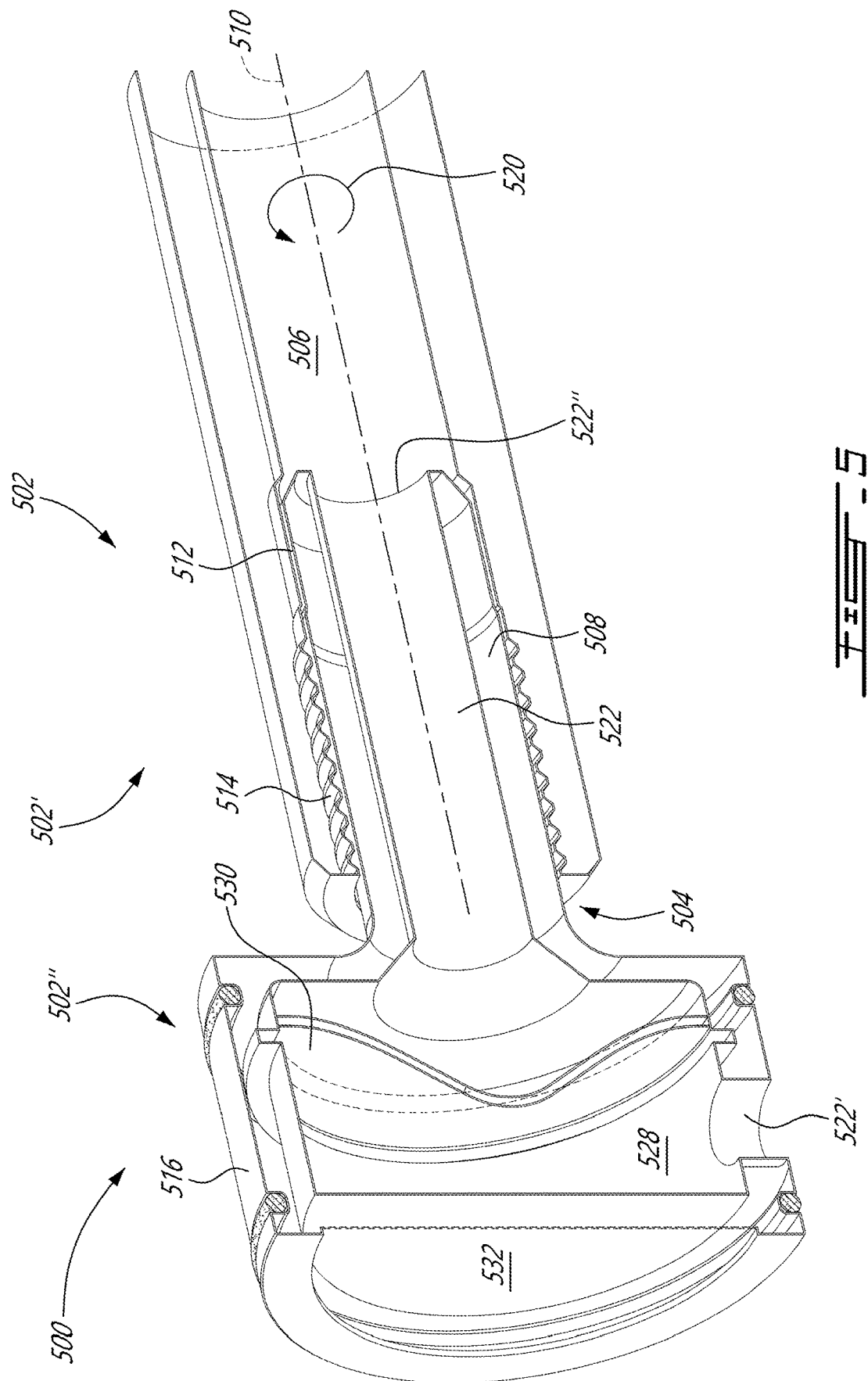

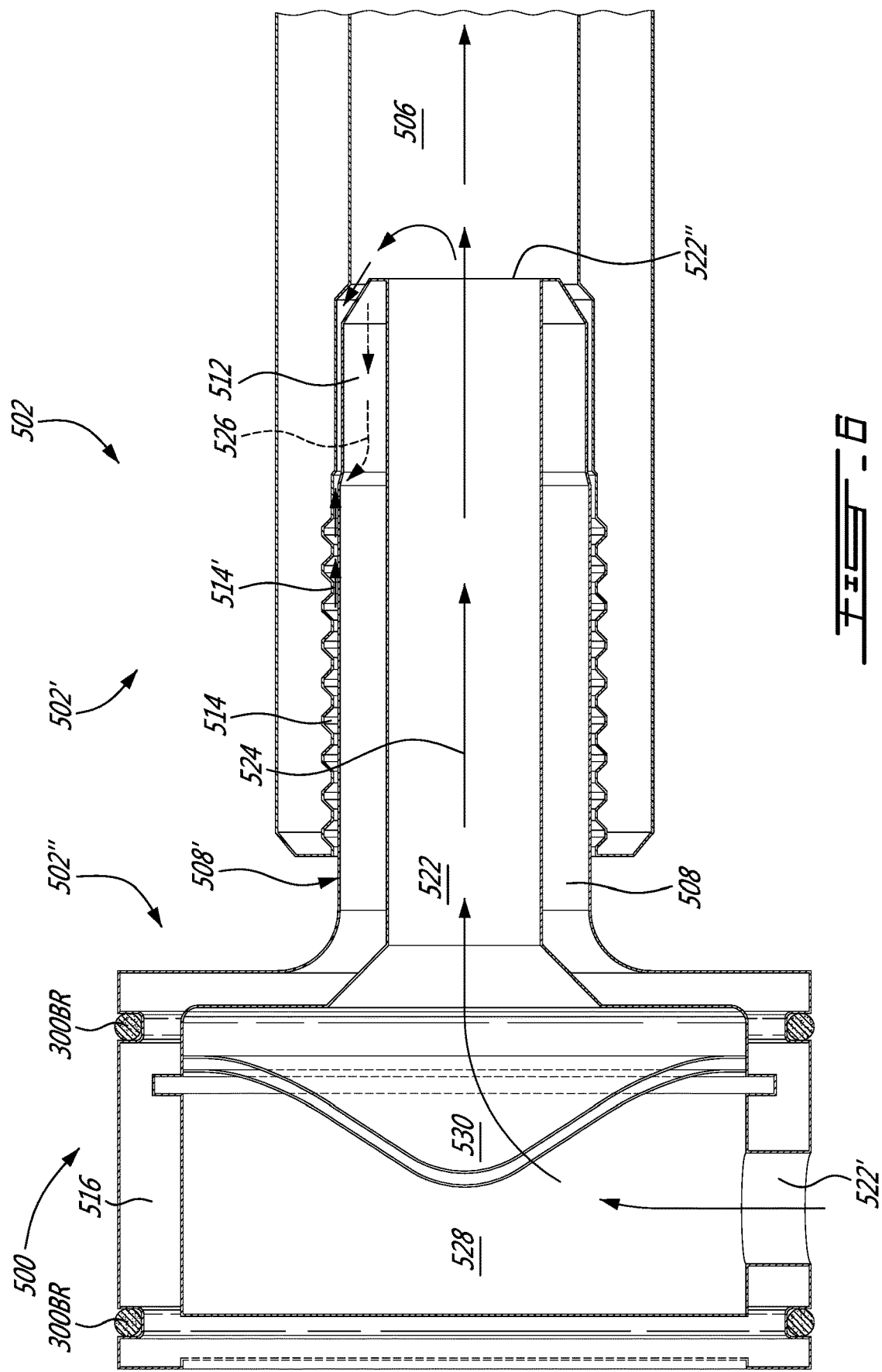

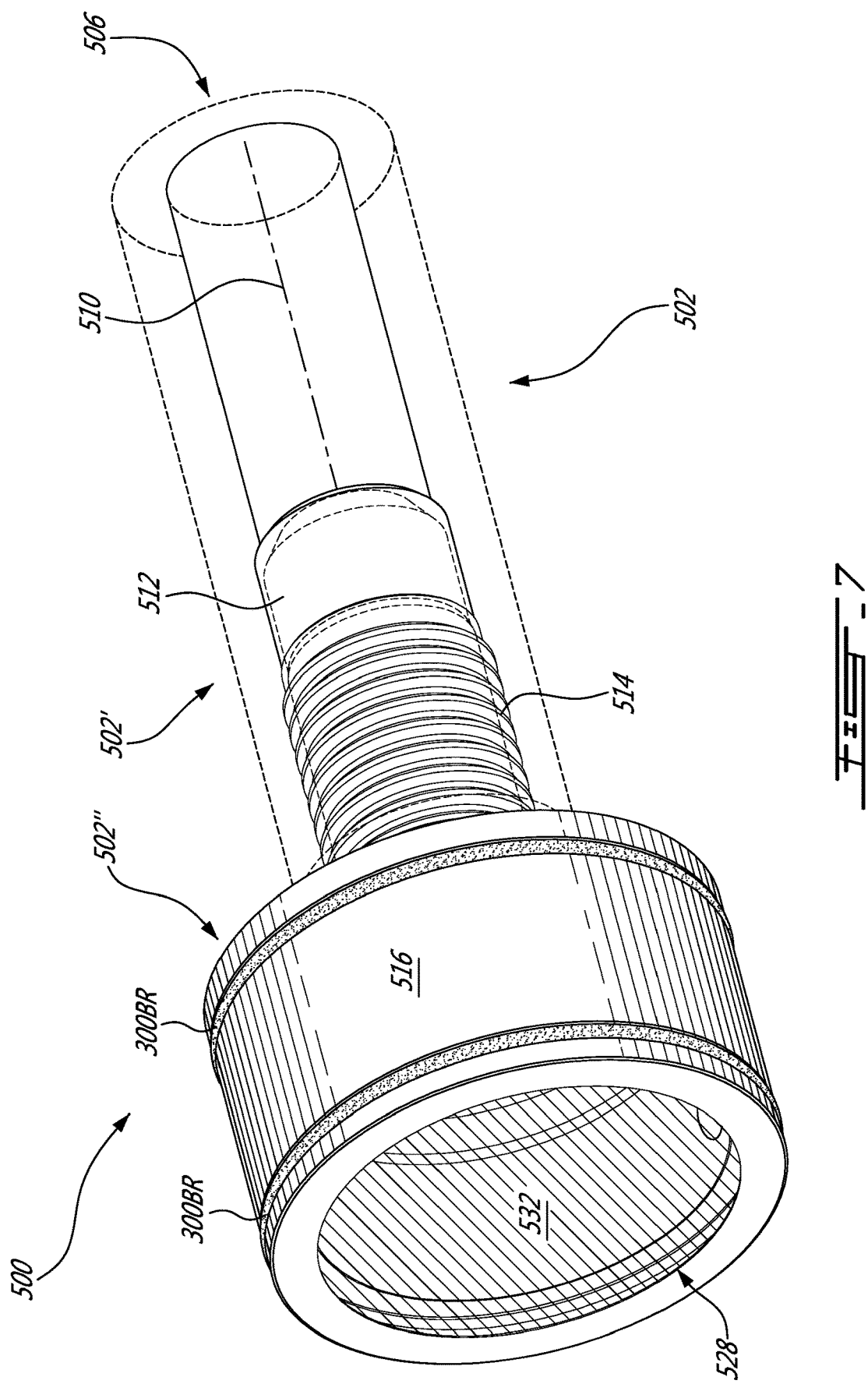

MACHINE HAVING A LIQUID LUBRICATION SYSTEM AND A SHAFT

TECHNICAL FIELD

The application relates to machines such as gas turbine engines.

BACKGROUND

Prior art machines, such as aircraft engines, typically have parts that require lubrication arrangements and bearing assemblies to facilitate operation. Prior art machines typically use lubrication and bearing systems that are suitable for their purposes, but that may be relatively complex and/or expensive to manufacture and/or assemble and/or maintain. Therefore, improvements to prior art bearing and/or lubrication systems are possible and desirable.

SUMMARY

In one aspect, the present technology provides a machine comprising a liquid lubrication system and a shaft, the shaft being rotatable about a rotation axis, the shaft including a first part, a second part engaged coaxially with the first part, and a journal bearing between the first part and the second part, the first part being rotatable relative to the second part about the rotation axis, a helical feature disposed between the first part and the second part and configured to define a helical pump between the first part and the second part, the pump being hydraulically connected to the liquid lubrication system, the journal bearing being disposed adjacent to the helical feature.

In some embodiments, the second part of the shaft is structured to float relative to the first part of the shaft when the first part of the shaft rotates about the rotation axis.

In some embodiments, the first part defines an axial channel therein, the axial channel including an opening in an end of the first part, the second part is received in the axial channel via the opening, and when the machine operates, the machine drives the first part and the second part relative to one another about the rotation axis, and the helical feature is shaped to generate a pumping action directed toward the journal bearing when the first part rotates relative to the second part about the rotation axis.

In some embodiments, in operation the machine rotates the first part relative to the second part about the rotation axis in a first direction, and the helical feature has a fin direction that is opposite to the first direction.

In some embodiments, the second part defines a liquid channel therethrough, the liquid channel hydraulically connecting the liquid lubrication system to the axial channel at a point inside the axial channel on the side of the journal bearing facing away from the helical feature.

In some embodiments, the second part includes a filter screen disposed in the liquid channel such that lubricant from the liquid lubrication system passes through the filter screen before reaching the axial channel.

In some embodiments, the second part includes an appendix received in the axial channel of the first part, and a base disposed outside of the first part, the journal bearing is received over the appendix, and the appendix includes a cylindrical outer surface disposed between the journal bearing and the base, and the helical feature is defined by an inner surface of the first part and is positioned over the cylindrical outer surface.

In some embodiments, the axial channel includes a generally cylindrical outer portion that receives the appendix therein, and a generally cylindrical inner portion extending into the first part of the shaft from the outer portion, and the inner portion is smaller in diameter than the outer portion.

In some embodiments, the machine includes a block supporting the first and the second parts of the shaft, the first and second parts of the shaft are coaxial, and the second part of the shaft is coupled to the block so as to be movable relative to the block and to the first part of the shaft along the rotation axis.

In another aspect, the present technology provides a machine comprising: a motor, a liquid lubrication system operatively connected to the motor to lubricate the motor during operation of the motor, a bearing, and a shaft including a first part and a second part, the first part defining an axial channel therein, the second part being received in the axial channel, the axial channel being hydraulically connected to the liquid lubrication system via the second part, the first part being operatively connected to the motor for rotation by the motor about a rotation axis relative to the second part with a helical feature disposed between the first part and the second part to define a helical pump between the first part and the second part, the bearing being disposed between the first part and the second part adjacent to the helical feature, the helical fin having a fin direction that is opposite to the rotation of the first part of the shaft.

In some embodiments, the liquid lubrication system is configured to move a liquid lubricant through the axial channel of the first part via a channel in the second part when the machine operates under a pressure sufficient to pass from the axial channel through the bearing toward the helical fin.

In some embodiments, the bearing is a journal bearing.

In some embodiments, the helical feature is a helical fin defined by the first part of the shaft.

In some embodiments, the appendix has a smooth cylindrical outer surface that faces the helical fin, with a gap being present between the helical fin and the smooth cylindrical outer surface.

In some embodiments, the second part of the shaft does not rotate about the rotation axis but is movable relative to the first part of the shaft along the rotation axis and/or about at least one axis angled relative to the rotation axis.

In some embodiments, a filter screen is disposed in the second part to filter flow of the liquid lubricant through the channel in the second part.

In another aspect, the present technology provides a method of operating a machine having a liquid system circulating a liquid when the machine is in use, comprising: rotating a first part of a shaft of the machine about a rotation axis relative to a second part of the shaft; circulating at least some of the liquid through the first part and the second part of the shaft; passing a flow of the liquid from inside the second part of the shaft into a bearing between the first part and the second part of the shaft; and generating a pumping action with a helical feature disposed between the first part and the second part of the shaft to oppose the flow into the bearing.

In some embodiments, the generating the pumping action allows at least some of the flow into the bearing to pass through the bearing.

In some embodiments, method comprises generating a pressure differential across the bearing using the pumping action and a pressure of the liquid inside the first part of the shaft, to allow at least some of the flow into the bearing to pass through the bearing.

In some embodiments, the generating the pressure differential includes pressurizing the liquid inside the first part of the shaft with a flow of the liquid from the liquid system.

DESCRIPTION OF THE DRAWINGS

Reference is now made to the accompanying figures in which:

FIG. 2B is a cross-sectional view of the end portion of FIG. 2A, taken along plane B-B in FIG. 2A;

FIG. 2D is a cross-sectional view of the end portion of FIG. 2A, taken along plane D-D in FIG. 2A;

FIG. 3 is a schematic perspective view showing an alternative embodiment of the end portion of FIG. 2A;

FIG. 4 is a schematic showing an aircraft engine, the engine comprising the shaft of FIG. 1;

FIG. 5 is a perspective sectional view showing the end portion of the shaft of the machine of FIG. 1, according to another embodiment;

FIG. 6 is an elevation sectional view of the end portion of FIG. 5; and

FIG. 7 is a partially transparent perspective view of the end portion of FIG. 5.

DETAILED DESCRIPTION

For the purposes of the present description, the term "fuel conduit" is used to describe an arrangement of one or more elements, such as one or more hoses, connectors and other elements, that together form a flow path or flow paths for a liquid fuel to flow from point A to point B. For example, a given fuel conduit may be defined by any number and combination of hoses or tubes hydraulically interconnected in parallel and/or series, and/or by or with one or more fuel filters, switches, pumps, nipples, tees, and the like. As another example, a given liquid lubricant conduit may be defined by any number and combination of hoses or tubes hydraulically interconnected in parallel and/or series, and/or by or with one or more lubricant filters, switches, pumps, nipples, tees, and the like.

Figure 1:
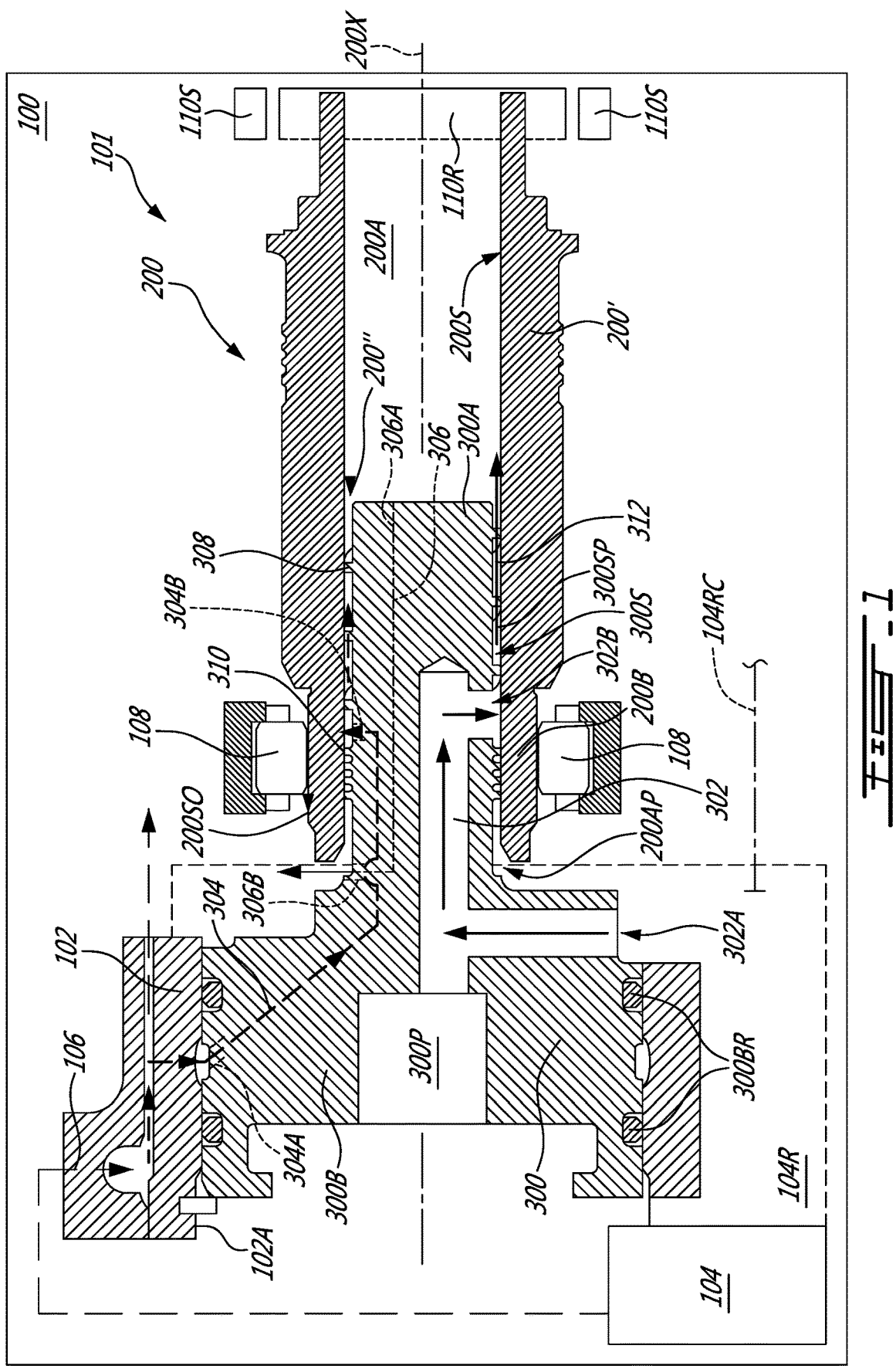
FIG. 1 is a schematic side view showing a machine having a shaft assembly and a liquid system circulating a liquid.

FIG. 1 schematically shows an auxiliary power unit (APU) 100 for an aircraft. It is contemplated that the APU 100 may be of any given APU type that uses at least one rotatable shaft requiring lubrication and/or cooling. The APU 100 is one particular example of a machine with respect to which, or in which, the present technology may be used. It is contemplated that the present technology may be used with a different type of machine that uses one or more rotatable shafts.

For example, it is contemplated that the APU 100, and more particularly the machine 100 in which the present technology may be used, could instead be an engine (an aircraft engine for example), an electric motor, an electric pump, a hybrid fuel/electric motor or pump, a pneumatic or hydraulic motor or pump, an electric generator, a gearbox and the like. One particular example of an electric motor is a starter for an engine.

The APU 100 includes a machine frame 102 supporting various components of the APU 100, a liquid system 104 (a.k.a. liquid cooling system, or liquid coolant system, or a liquid lubrication system), which in the present embodiment is a lubrication system 104, that contains a liquid (in the present embodiment, a lubricant, and more particularly an oil), a rotor 110R and a stator 110S for generating electricity; although in other embodiments the rotor 110R and the stator 110S may be omitted and/or may not be part of the APU 100. In the present embodiment, the lubrication system 104 lubricates and/or cools various components of the APU 100. In other embodiments, the system 104 may be a different liquid system. For example, in embodiments where the element/machine 100 is an electric generator, the system 104 is a liquid cooling system of the electric generator. In some such embodiments, the liquid cooling system 104 uses a lubricant such as oil, but other liquids are also contemplated.

As schematically shown in FIG. 1, a shaft assembly 101 is installed in the APU 100 as a part thereof. It is contemplated that a different type of lubricant or a different type of liquid may be used depending on each particular embodiment and application of the shaft assembly 101 and/or the particular embodiment and application of the machine in which the shaft assembly 101 is used. In the present embodiment, the shaft assembly 101 includes a bearing assembly 108 and a shaft 200. In some embodiments, the bearing assembly 108 may be omitted.

The shaft 200 includes a first part 200' and an end portion 300 (a.k.a. second part 300). As described in more detail below, the first part 200' and the end portion 300 define a liquid pump 200" therebetween. In the the present embodiment, the liquid pump 200" is a lubricant pump that circulates at least part of the lubricant in the lubrication system 104 of the APU 100. In other embodiments, the liquid pump 200" circulates other liquids for other purposes, such as circulating a liquid for cooling one or more parts of the machine with which it is used.

In other embodiments, such as where the APU 100 is instead an engine, the pump 200" may be a recirculation pump that lubricates components of the engine and recirculates oil through the lubrication system 104 of the engine. In yet other embodiments, such as where the APU 100 is instead an electric motor, the pump 200" may be a scavenge pump that scavanges oil to a gearbox associated with the electric motor, thereby evacuating hot oil and cooling the electric motor. In such other embodiments, the shaft 200 may serve a different one or more purposes than the purposes described herein with respect to the APU 100 application.

Referring to FIG. 1, in the present embodiment, the first part 200' of the shaft 200 is rotatably supported by the machine frame 102 by the bearing assembly 108 and the end portion 300 to rotate about a rotation axis 200X. The first part 200' of the shaft 200 is connected to the rotor 110R to rotate the rotor 110R about the rotation axis 200X relative to the stator 110S.

The first part 200' of the shaft 200 is also connected to a power source (not shown) using a connection suitable to the particular embodiment and application of the APU 100 and is driven by the power source to rotate relative to the stator 110S. In other embodiments of the present technology in which the APU 100 is a different machine, the first part 200' of the shaft 200 may be connected to a different one or more elements of the machine and/or to one or more elements that are not part of the machine.

In some embodiments, the power source may be a turbine engine for example. It is contemplated that the power source may be internal or external to the APU 100, or other machine in/with which the shaft assembly 101 is used. It is contemplated that a different power generation assembly/arrangement may be used instead of or in addition to the rotor 110R and the stator 110S. It is contemplated that the APU 100 could have additional and/or other shafts that may be implemented according to the present technology as it is described in this document.

Still referring to FIG. 1, an inner surface 200S of the first part 200' of the shaft 200 defines an axial channel 200A through at least part of the first part 200' of the shaft 200. The axial channel 200A may be hydraulically connected to one or more parts of the APU 100 (or other machine with which the present technology is used) to supply liquid (in this embodiment, lubricant) thereto and to thereby lubricate and/or cool the one or more parts. As shown, the axial channel 200A defines an opening 200AP in an end 200B of the first part 200' of the shaft 200.

The end portion 300 of the shaft 200 is received in the first part 200' of the shaft 200 in the axial channel 200A via the opening 200AP such that the first part 200' of the shaft 200 is rotatable relative to the end portion 300 about the rotation axis 200X. In the present embodiment, the first part 200' of the shaft 200 is rotatable over the end portion 300. In other embodiments, the end portion 300 is disposed over the first part 200' of the shaft 200.

Figure 2A:
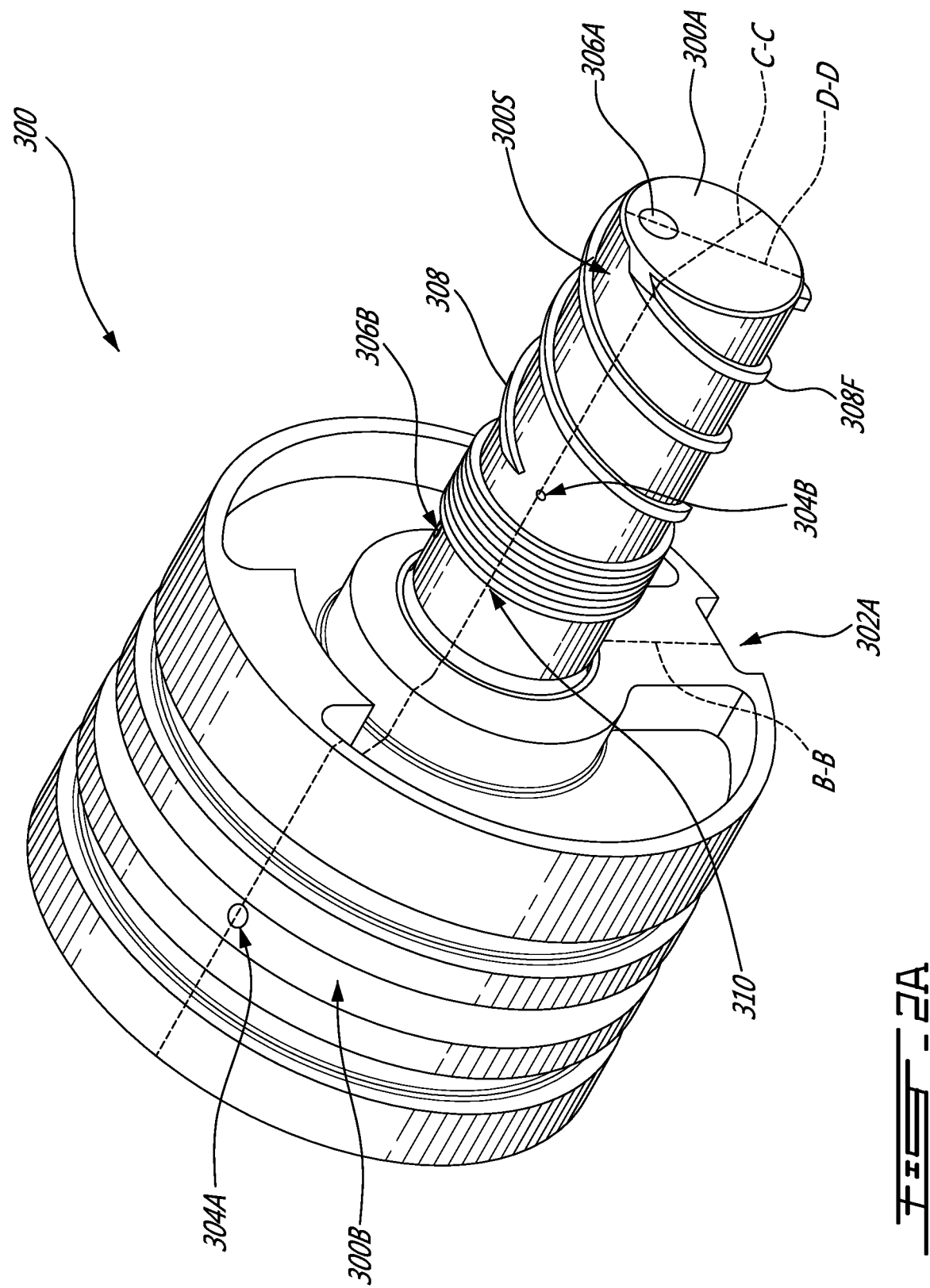
FIG. 2A is a perspective view showing an end portion of the shaft of the machine of FIG. 1.

In the present embodiment, and now referring also to FIG. 2A, the end portion 300 includes a cylindrical appendix 300A that is received in the axial channel 200A of the shaft 200, and a base 300B attached to an outer end (not labeled) of the appendix 300A. It is contemplated that the part 300A received in the axial channel 200A could have a different shape, so long as the functionality described in this document is achieved. In the present embodiment, the base 300B is integral with the appendix 300A, but they may be separate interconnected components as well. In the present embodiment, the base 300B is cylindrical in shape. It is contemplated that the base 300B could have a different shape.

As schematically shown in FIG. 1, and in FIG. 2B, the end portion 300 defines therethrough a lubricant channel 302 along plane B-B shown in FIGS. 2A and 2B. In the present embodiment, the lubricant channel 302 serves to convey lubricant from the lubrication system 104 into the axial channel 200A and then to one or more components of the APU 100 via the shaft 200 at least when the shaft 200 rotates about the rotation axis 200X relative to the end portion 300. It is contemplated that to this end, the shaft 200 could have suitable apertures and/or conduits for delivering lubricant to the one or more components of the APU 100. It is contemplated that in some such embodiments, lubricant may return to the lubrication system 104 via one or more suitable return conduits 104RC.

The lubricant channel 302 includes an opening 302A that serves as an inlet in the present embodiment. As schematically shown in FIG. 1, the opening 302A is defined in a part (not labeled) of the end portion 300 that is disposed outside of the shaft 200. The opening 302A is hydraulically connected to a lubricant cavity 104R of the lubrication system 104 to receive lubricant therefrom and to make the lubricant available to the pump 200". In the present embodiment, the base 300B of the end portion 300 is at least in part disposed inside the lubricant cavity 104R. It is contemplated that the base 300B may be positioned entirely outside of the lubricant cavity 104R and may be hydraulically connected thereto by a lubricant conduit extending from the opening 302A to the lubricant cavity 104R.

As shown in FIG. 1, in the present embodiment, the lubricant channel 302 extends through the end portion 300 from the opening 302A to an opening 302B defined in the appendix 300A. The lubricant channel 302 may extend in a same direction as the rotation axis 200X. The opening 302B in this embodiment serves as an outlet and faces the inner surface 200S of the shaft 200. As explained in more detail below, at least when the shaft 200 rotates about the rotation axis 200X relative to the end portion 300, the opening 302B supplies lubricant into an annular space 300SP defined between the inner surface 200S of the shaft 200 and the outer surface 300S of the end portion 300 as depicted by flow arrows 312 in FIG. 1. In the present embodiment, an axis of the opening 302B is radial to the inner surface 200S, but could instead be angled relative thereto. In some embodiments, the opening 302A is angled to make the liquid path through the lubricant channel 302 less arduous.

Still referring to FIG. 1, in the present embodiment, the lubricant channel 302 includes at least an axial portion (not separately labeled) that may extend in parallel to the rotation axis 200X. Stated different a central axis of the lubricant channel 302 may be parallel to the rotation axis 200X. As shown, this axial portion is closed off by a plug 300P. This construction facilitates manufacturing the end portion 300, as it allows the axial portion of the lubricant channel 302 to be drilled into the end portion 300 from the outer end of the end portion 300, with the outer end then being closed off by the plug 300P. It is contemplated that a different manufacturing method may be used to produce the end portion 300 and the various channels therethrough as the channels are described in this document.

Now referring to both FIG. 1 and FIG. 2A, the end portion 300, and more particularly the appendix 300A thereof defines a helical feature 308 that moves lubricant from the lubricant cavity 104R and moves the lubricant into the axial channel 200A of the shaft 200 via the lubricant channel 302 when the shaft 200 rotates about the rotation axis 200X relative to the end portion 300.

As best shown in FIG. 2A, in the present embodiment the helical feature 308 is at least one helical fin 308F that extends circumferentially about the outer surface 300S of the appendix 300A and about the rotation axis 200X. In other embodiments, the helical feature 308 is at least one helical groove (e.g. see groove 332G in FIG. 3). It is contemplated that in other embodiments, the helical feature 308 could include a combination of one or more fins and one or more grooves.

It is also contemplated that the helical feature 308 may be defined by, or may be disposed on, in part or in whole, the inner surface 200S of the first part 200' of the shaft 200. It is also contemplated that in embodiments in which the end portion 300 is disposed over the first part 200' of the shaft 200, the helical feature 308 may be defined by an outer surface 200SO of the first part 200' of the shaft 200 and/or by an inner surface of the end portion 300 to provide the functionality described in this document.

Also, in some embodiments, the helical feature 308 may be structured to move liquid from the axial channel 200A out of the shaft 200 via the lubricant channel(s) 302. In such embodiments, the opening 302B of the lubricant channel 302 serves as an inlet and the opening 302A of the lubricant channel 302 serves as an outlet.

As best shown in FIG. 2A, in the present embodiment, the at least one fin 308F is disposed inside the axial channel 200A of the shaft 200 circumferentially about the rotation axis 200X. As shown, the at least one fin 308F is a helical fin that is rectangular in cross-section and extends radially outward from the outer surface 300S of the appendix 300A. In other embodiments, the fin(s) 308F may have a different cross sectional shape and/or may be a separate part(s) attached to the appendix 300A. It is contemplated that a different number and/or pitch (spacing) of fin(s) 308F may be used depending on each particular embodiment and application of the shaft assembly 101.

In the present embodiment, the appendix 300A of the end portion 300 and the helical feature 308 are coaxial with the first part 200' of the shaft 200. It is contemplated that the helical feature 308 may be of a different type of element that moves lubricant when the first part 200' of the shaft 200 rotates relative to the end portion 300 about the rotation axis 200X. It is contemplated that the helical feature 308 (e.g. the one or more fins) may be manufactured separate from the end portion 300 and attached/fixed to the end portion 300.

It is contemplated that the helical feature 308 could instead be defined by the inner surface 200S of the shaft 200 and that in some such embodiments the corresponding portion of the appendix 300A may be smooth and free from fins and grooves. It is also contemplated that multiple helical features 308 may be used. In some such embodiments, it is contemplated that the helical features 308 may be in series, with at least one of the helical features 308 defined by the first part 200' of the shaft 200 and at least another one of the helical features 308 defined by the end portion 300.

In the present embodiment, the helical feature 308 is smaller in diameter than the inner diameter of the axial channel 200A of the shaft 200, so that there is a space between the helical feature 308 and the inner surface 200S of the first part 200' of the shaft 200. This allows the first part 200' of the shaft 200 to rotate freely over the helical feature 308 and the end portion 300 and to thereby operate the helical feature 308 to move lubricant into and through the axial channel 200A. In the present embodiment, this space, and the rest of the annular space 300SP defined between the inner surface 200S of the shaft 200 and the outer surface 300S of the end portion 300, is seal-free and bearing-free.

The shaft 200 may further include an annular seal 310 disposed between the helical feature 308 and the end 200B of the first part 200' of the shaft 200 that receives the end portion 300. The seal 310 at least substantially hydraulically seals the end 200B of the first part 200' of the shaft 200. In the present embodiment, the seal 310 is a labyrinth seal 310 defined by the outer surface 300S of the end portion 300. In the present embodiment, the seal 310 is integral to the rest of the end portion 300 and is smaller in diameter than the inner diameter of the axial channel 200A of the first part 200' of the shaft 200, so that there is a minute gap/space between the seal 310 and the inner surface 200S of the shaft 200, allowing the first part 200' of the shaft 200 to freely rotate over the helical feature 308.

It is contemplated that the seal 310 may be a different seal, such as one or more carbon seals on a surface of the first part 200' of the shaft 200 for example. It is contemplated that the seal 310 may be manufactured separate from the end portion 300 and attached/fixed to the end portion 300. It is also contemplated that the seal 310 may be defined by the inner surface 200S of the first part 200' of the shaft 200. It is also contemplated that multiple seals 310 may be used.

Figure 2C:
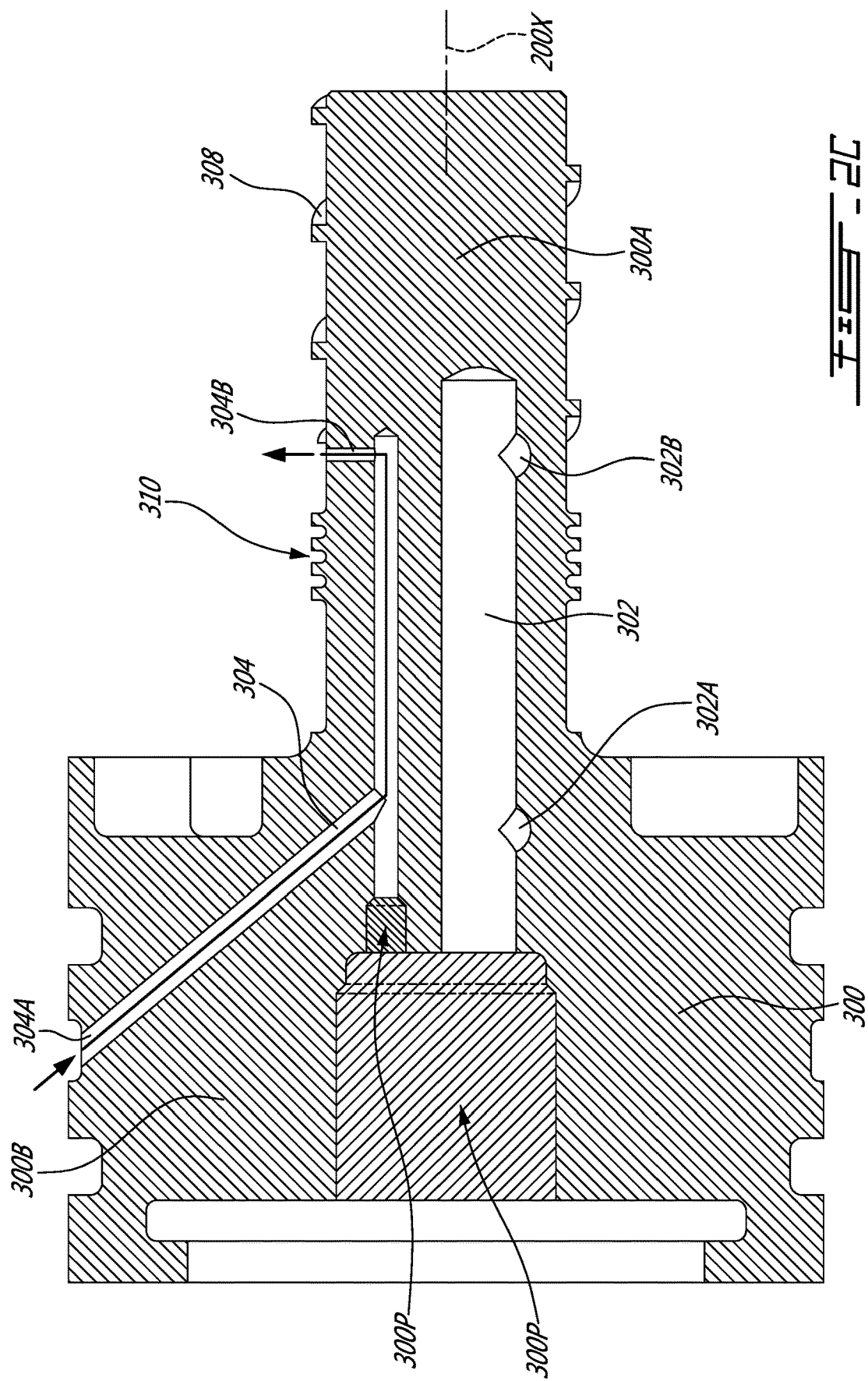
FIG. 2C is a cross-sectional view of the end portion of FIG. 2A, taken along plane C-C in FIG. 2A.
Figure 20:
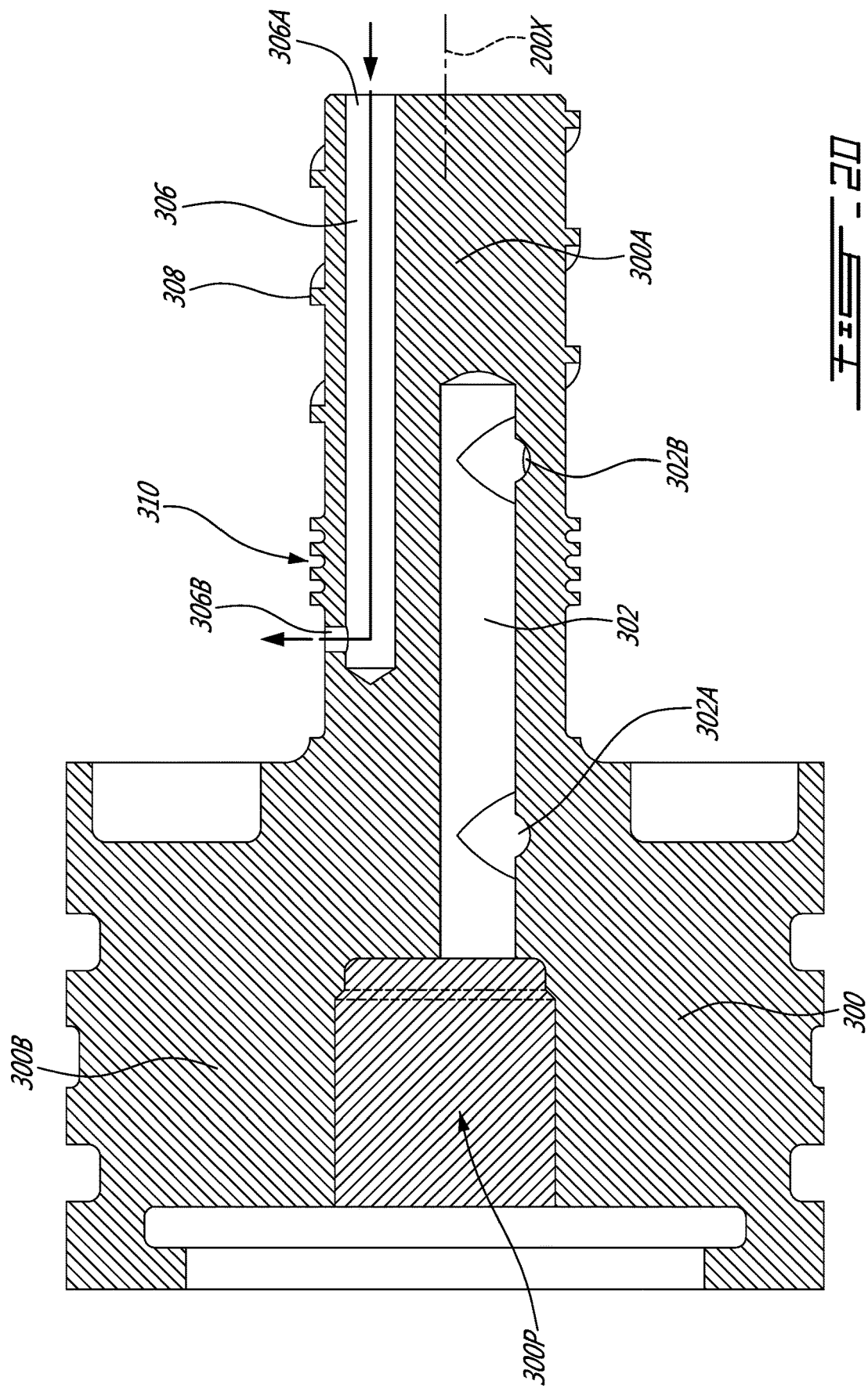

As schematically shown in FIG. 1, and in FIG. 2C, the end portion 300 further defines therethrough a priming lubricant channel 304 along plane C-C shown in FIGS. 2A and 2C. The priming lubricant channel 304 includes an opening 304A that is hydraulically connected to a liquid conduit 106 of the lubrication system 104 and serves as an inlet to the priming lubricant channel 304 in the present embodiment. As shown in FIG. 1, the liquid conduit 106 is defined at least in part by the machine frame 102 and supplies lubricant to various one or more parts of the APU 100 in addition to supplying priming lubricant to the priming lubricant channel 304. In some cases, at least part of the lubrication system 104 is pressurized prior to rotating the first part 200' of the shaft 200 to move at least some lubricant from the lubrication system 104 into the interface between the first part 200' and the end portion 300 to prime the interface and the pump 200".

It is contemplated that the liquid conduit 106 may be defined in any suitable way and/or in any suitable part(s) of the APU 100. It is contemplated that the liquid conduit 106 could hydraulically connect to any suitable part of the lubrication system 104. It is contemplated that the lubrication system 104 could include one or more liquid return conduits for recirculating at least some of the lubricant supplied to one or more components of the APU 100. It is also contemplated that the liquid conduit 106 may be part of a lubrication system that is separate from, or otherwise redundant to, the lubrication system 104.

The lubrication system 104 is shown as being internal to the APU 100. It is contemplated that a given machine, such as the APU 100, that implements the present technology as described herein, could have/use an external lubrication system instead of or in addition to an internal lubrication system. It is also contemplated that in some embodiments, and depending on the particular application of the present technology and/or the particular type of machine with which the present technology is used for example, the lubrication system 104 could instead be a cooling system and that accordingly the lubricant may be a different type of liquid pumped/moved by the helical feature(s) 308 of the shaft 200. Yet other liquid systems and/or liquids are also contemplated.

In the present embodiment, and as shown in FIGS. 1 and 2C, the priming lubricant channel 304 extends from the opening 304A to an opening 304B defined in the appendix 300A, via the base 300B and the appendix 300A of the end portion 300. The opening 304B in this embodiment serves as an outlet from the priming lubricant channel 304. The opening 304B opens into the annular space 300SP defined between the inner surface 200S of the shaft 200 and the outer surface 300S of the end portion 300, and faces the inner surface 200S of the first part 200' of the shaft 200. In the present embodiment, an axis of the opening 304B is radial to the inner surface 200S, may be angled relative thereto. In some embodiments, the priming lubricant channel 304 may be omitted.

As shown in FIG. 1, the opening 304B is disposed at the outer surface 300S of the end portion 300 between the helical feature 308 and the seal 310. In the present embodiment, the lubrication system 104 is adapted to supply lubricant into the annular space 300SP defined between the inner surface 200S of the first part 200' of the shaft 200 and the outer surface 300S of the end portion 300 at least when the shaft 200 is stationary relative to the end portion 300. The priming lubricant channel 304 thereby primes the interface between the helical feature 308 and the inner surface 200S of the shaft 200 with lubricant, independent of whether or not the shaft 200 is rotating relative to the end portion 300. It is contemplated that in some embodiments, the priming lubricant channel 304 may be omitted.

Still referring to FIG. 1, in the present embodiment, the end portion 300 is supported in the machine frame 102 of the APU 100 by being received in an aperture 102A defined through a part of the machine frame 102. As schematically shown in FIG. 1, the aperture 102A is cylindrical in shape and is coaxial with the shaft 200. Also as shown, the end portion 300 is received in the aperture 102A and into the axial channel 200A. A pair of annular seals 300BR received in corresponding annular grooves (not labeled) that are likewise coaxial with the shaft 200, hydraulically seal the interface between the outer surface of the base 300B of the end portion 300 and the surface of the machine frame 102 defining the aperture 102A.

The seals 300BR thereby prevent priming oil from leaking out from the interface between the base 300 and the frame 102. In the present embodiment, the base 300B of the end portion 300 is smaller in diameter than the diameter of the aperture 102A in which the base 300B is received, thereby allowing some translational movement between the end portion 300 and the machine frame 102 along the rotation axis 200X of the shaft 200 and/or some pivoting movement about the rotation axis 200X. This translational and/or pivotable connection, in combination with the coaxial arrangement of the shaft 200, the end portion 300, and the aperture 102A, in at least some embodiments and applications of the shaft assembly 101, allows the end portion 300 to self-center inside the shaft 200 during operation of the APU 100 and/or to absorb at least some expansions and/or contractions of the shaft 200 that may occur during use due to variations in temperature.

It is contemplated that in some embodiments, the end portion 300 may be fixed to the machine frame 102. It is also contemplated that in some embodiments, the end portion 300 may be made integral with and/or could otherwise be part of the machine frame 102. It is also contemplated that in some embodiments, the end portion 300 may be made rotatable relative to the machine frame 102 about the rotation axis 200X.

Still referring to FIG. 1, and in FIG. 2D, in the present embodiment, the end portion 300 further defines an air vent channel 306 therethrough along plane D-D shown in FIGS. 2A and 2D. The air vent channel 306 extends from an air inlet 306A to an air outlet 306B. The air vent channel 306 is at one end is hydraulically connected to the axial channel 200A of the shaft 200 and at another end hydraulically connects either to a part of the lubricant cavity 104R that does not contain lubricant, to another container, or to atmosphere, depending on each particular embodiment and application of the APU 100. To this end, and now referring to FIGS. 1 and 2D, the air vent channel 306 includes an opening 306A defined in an end of the appendix 300A. The air vent channel 306 may be at a location that is assymetrical relative to the shape of the end of the appendix 300A.

The air vent channel 306 vents air that may from time to time be introduced into the axial channel 200A of the shaft, and in some embodiments pressurizes the air space to the left of the seal 310 although this need not be the case. Notably, in the present embodiment, the air vent channel 306 is defined through the end portion 300 separately from the the priming lubricant channel 304 and does not hydraulically connect to the the priming lubricant channel 304 via any point inside the end portion 300. It is contemplated that at least in some embodiments of the present technology, the air vent channel 306 may be omitted and/or may be defined through other parts of the APU 100/machine 100.

As can be seen from FIGS. 2A to 2D, in the present embodiment the channels 302, 304 and 306 are defined in the end portion 300 along different planes (B-B, C-C, and D-D, respectively) passing through the end portion 300. It is contemplated that in other embodiments, one or more of the channels 302, 304 and 306 may be axially in-line, and that in some embodiments channels 302 and 304 may hydraulically interconnect within the end portion 300.

In the present embodiment, the channels 302, 304 and 306 do not hydraulically interconnect to each other at any location inside the end portion 300. Also as can be seen from FIGS. 2A to 2D, in the present embodiment, the channels 302, 304 and 306 are defined by bores drilled into the end portion at respective locations, with plugs 300P, or other suitable elements, being subsequently inserted into parts of the bores to define the channels 302, 304, 306 as described in this document. It is contemplated that a different manufacturing method may be used. For example, it is contemplated that the end portion 300 may be manufactured with the channels 302, 304, 306 therethrough by additive manufacturing, in which embodiments the plugs 300P may be omitted.

Now referring to FIG. 3, an end portion 330 is shown. The end portion 330 is similar to the end portion 300 and features of the end portion 330 are labeled with the reference numerals of corresponding features of the end portion 300. A difference between the end portion 330 and the end portion 300 is that the end portion 330 defines a different helical feature 332. The helical feature 332 includes a cylindrical portion 332C that is larger in diameter than an intermediate portion 330M of the cylindrical appendix 330A of the end portion 330 that defines the opening 304B of the priming lubricant channel 304 therein. The cylindrical portion 332C of the helical feature 332 is smaller in diameter than the axial channel 200A of the first part 200' of the shaft 200 that the helical feature 332 is received in and thereby allows the first part 200' of the shaft 200 to rotate freely over the helical feature 332.

The cylindrical portion 332C defines at least one groove 332G therein, is defined circumferentially around the cylindrical portion 332C and extends from an outer end 332A of the cylindrical portion 332C to an inner end 332B of the cylindrical portion 332C. In the present embodiment, the at least one groove 332G is helical in shape. In embodiments of the shaft assembly 101 that have the end portion 330, when the first part 200' of the shaft 200 rotates about the rotation axis 200X over the at least one groove 332G, the at least one groove 332G moves lubricant from the lubrication system 104, via the at least one groove 332G, into the axial channel 200A of the first part 200' of the shaft 200. The lubricant may thereafter flow via the axial channel 200A through additional channel(s) defined through the first part 200' of the shaft 200 to one or more components of the APU 100 requiring lubrication and/or cooling.

It is contemplated that in some embodiments and/or applications of the present technology, the helical feature 332 may be structured to pump/move lubricant in an opposite direction, from the axial channel 200A and out of the shaft 200 via the lubricant channel 302. It is contemplated that in some such embodiments, lubricant could recirculate from the lubricant cavity 104R back into the axial channel 200A of the shaft 200 upstream of the helical feature 332 via the return conduit 104RC, and could thereafter flow back to the helical feature 332 to again be pumped out of the shaft 200 and into the lubricant cavity 104R.

Reference is now made to FIG. 4, which illustrates another contemplated use of the present technology. More particularly, FIG. 4 shows a turbofan aeroengine 450 of a type preferably provided for use in subsonic flight, generally comprising in serial flow communication a fan 452 through which ambient air is propelled, a compressor section 454 for pressurizing the air, a combustor 456 in which the compressed air is mixed with fuel and ignited for generating an annular stream of hot combustion gases, and a turbine section 458 for extracting energy from the combustion gases.

The turbine section 458 includes a low pressure shaft 458L that couples the turbine section 458 to the fan 452 to drive the fan 452, and a high pressure shaft 458H that couples the turbine section 458 to the compressor section 454 to drive the compressor section 454. Components of the engine 450, including the low pressure shaft 458L and the high pressure shaft 458H, are rotatable about a longitudinal center axis 460 of the engine 450.

In this embodiment, the engine 450 further includes a shaft assembly 462 according to the present technology. The shaft assembly 462 is similar to the shaft assembly 101 described above. Therefore, features of the shaft assembly 462 are labeled with the reference numerals of corresponding features of the shaft assembly 101. As shown, in this embodiment, the rotation axis 200X of the shaft assembly 462 is collinear with the longitudinal center axis 460 of the engine 450. It is contemplated that depending on the particular embodiment and application of the shaft assembly 462, this need not be the case.

A difference between the shaft assembly 462 and the shaft assembly 101 is that the shaft assembly 462 is part of the low pressure shaft 458L. As schematically shown in FIG. 4, it is contemplated that the shaft assembly 462 could use the end portion 300 or the end portion 400. It is contemplated that yet another embodiment of the end portion 300, 400 according to the present technology, such as an embodiment having a different type of helical feature, also may be used.

In the embodiment of FIG. 4, the engine 450 is the machine that includes the shaft assembly 462, the machine frame 102 that supports the end portion 300, 400 is a frame of the engine 450, the lubrication system 104 is a lubrication system of the engine 450, and the bearing assembly 108 is a bearing assembly (not shown) of the low pressure shaft 458L.

While in the contemplated example shown in FIG. 4 the present technology is used with respect to the low pressure shaft 458L of a turbofan engine, it is likewise contemplated that the present technology could also be used with respect to other one or more shafts of the engine 450 and/or with respect to one or more rotatable shafts of a different type of engine. For example, it is contemplated that the present technology may be used to provide one or more shafts of a turboprop aeroengine or a turboshaft aeroengine. While in FIG. 4 the end portion 300, 400 is shown as being used at a rear end of a shaft and at a rear part of an engine, it is contemplated that the end portion 300, 400 could instead be used at a front end of a shaft and/or at a front part of an engine.

With the above embodiments in mind, the present technology provides a method of cooling and/or lubricating a machine 100, such as the APU 100 or an electric generator or the engine 450.

For example, in some electric generator embodiments, the method includes operating the electric generator, with heat generated by the electric generator being transferred into a liquid in a liquid cooling system. As an example with regard to FIG. 1, element 100 may be the electric generator, and element 104 may be the liquid cooling system and/or the liquid lubrication system. The method may further include rotating the first part 200' of the shaft 200 of the machine 100 about the rotation axis 200X relative to a second part (e.g. the end portion 300) of the shaft 200, with the helical feature 308 being disposed between the first part 200' and the second part 300 to define the helical pump 200" between the first part 200' and the second part 300, and with the rotating the first part 200' causing the helical pump 200" to circulate at least some of the liquid (in the example above, oil) through the first part 200' of the shaft 200.

Further, in some embodiments, the rotating the first part 200' of the shaft 200 causes the helical pump 200" to circulate at least some of the liquid through the liquid cooling and/or lubrication system 104.

Also in some embodiments, the method includes, before the rotating the first part 200' of the shaft 200, pressurizing at least part of the liquid cooling system 104 to move at least some of the liquid therefrom into an interface between the first part 200' and the second part 300 of the shaft 200 and thereby priming the interface.

As seen in the embodiments above, in some embodiments of the machine 100 and the shaft 200, the priming the interface includes supplying the at least some of the liquid into the interface via a channel 304 defined through the second part 300 of the shaft 200.

Now referring to FIGS. 5 to 7, a shaft assembly 500, which is yet another embodiment of the shaft assembly 101, is shown. The shaft assembly 500 includes a shaft 502 that in turn includes a main shaft portion 502' and an end portion 502" received in an open end of the main shaft portion 502'. More particularly, this arrangement may be referred to as a first shaft 502', and a second shaft 502" coaxially engaged to the first shaft 502'. Similar to the end portion 300 of the shaft assembly 101, in some embodiments the end portion 502" may be supported by and/or coupled to a block 102 and/or frame 102 of the machine 100 (which may be, for example, the aeroengine 450 described above) with which the shaft assembly 500 is used, so as to substantially not rotate about the rotation axis 510 of the main shaft portion 502', but to be movable relative to the main shaft portion 502' along the rotation axis 510. In some embodiments though, the end portion 502" may be rotatable relative to the block and/or frame 102 about the rotation axis 510. In embodiments in which the machine 100 is an aeroengine 450, the main shaft portion 502' may be a shaft of the aeroengine 450, such as, for example, the high pressure shaft 458H, the low pressure shaft 458L, or an accessory-driving shaft 104.

In the present embodiment, the main shaft portion 502' and the end portion 502" of the shaft 502 define a liquid pump 504 therebetween. The shaft assembly 500 is similar to the shaft assembly 101, and therefore only aspects/features that differ are described herein in detail.

As shown, the main shaft portion 502' of the shaft 502 defines an axial channel 506 therein that is open at one end of the main shaft portion 502' and receives the appendix 508 of the end portion 502" therein. In this embodiment, the axial channel 506 narrows in diameter inward of the appendix 508, such as in counterbore-like manner, which in at least some applications helps provide for a more stable rotational interface between the appendix 508 and the main shaft portion 502' of the shaft 502. In other embodiments, the axial channel 506 may be substantially constant in diameter.

As seen in FIG. 6, in this embodiment, the shaft assembly 500 includes a bearing 512 mounted onto the appendix 508. The bearing 512 is thus disposed between the appendix 508 and the inner surface of the main shaft portion 502' of the shaft 502 that defines the axial channel 506. In an embodiment, the bearing 512 is a journal bearing, though roller bearing(s) and/or yet other bearing types may be used as well. In an embodiment, the bearing 512 is a journal bearing made of a sleeve of low friction material, such as a polymer, and may be a monoblock piece. For example, a material that may be used for the sleeve may be the same material as used for the appendix 508 and/or the main shaft portion 502', with a smooth surface finish, and may optionally be coated with a low friction coating, such as Polytetrafluoroethylene (PTFE).

The bearing 512 provides a rotational interface between the appendix 508 and the main shaft portion 502' of the shaft 502. In some embodiments, the bearing 512 may be omitted, and this may help provide for self-centering action of the main shaft portion 502' relative to the appendix 508 in some applications. Another difference from the shaft assembly 101 is that in the shaft assembly 500, it is the inner surface defining the axial channel 506 that defines the helical fin 514.

As best seen in FIG. 6, in this embodiment the helical fin 514 is recessed into the inner surface of the main shaft portion 502' of the shaft 502. In this embodiment, the appendix 508 includes a cylindrical outer surface 508' which is disposed between the bearing 512 and the base 516 of the end portion 502". As shown, in this embodiment the cylindrical outer surface 508' is smooth. Stated differently, the cylindrical outer surface 508' may be a constant diameter, and/or free from helical features and/or surface disruptions. In other embodiments, this need not be the case. The helical fin 514 is positioned over the cylindrical outer surface 508' and is sized such that an annular gap is present between the helical fin 514 and the cylindrical outer surface 508'. As shown, the helical fin 514 is shaped to be substantially coaxial with and disposed circumferentially about the appendix 508 and the rotation axis 510, though a slight offset may be present. As described above with respect to other embodiments, the helical fin 514 is one example of a helical feature that can be used. Other helical features, or a combination of different helical features, may also be used.

The helical fin 514 and a corresponding part of the cylindrical outer surface 508' of the appendix 508 define the liquid pump 504 of the shaft assembly 500 when rotated relative to one another. The direction of the helical fin 514, referred to as a fin direction, is selected such that when operated, the liquid pump 504 generates a pumping action on any liquid that might be present at the given time in the gap between the helical fin 514 and the corresponding part of the cylindrical outer surface 508', in a direction depicted by arrows 514' in FIG. 6. In the present embodiment, the direction 514' of the pumping action is provided by orienting the thread orientation of the helical fin 514 opposite to the direction 520 of rotation of the main shaft portion 502'.

Hence, in embodiments in which the direction 520 of rotation of the main shaft portion 502' is clockwise, the fin direction of the helical fin 514 is counter-clockwise. Conversely, in embodiments in which the direction 520 of rotation of the main shaft portion 502' of the shaft 502 is counter-clockwise, the fin direction of the helical fin 514 is clockwise. For the purposes of this document, the term "fin direction" includes thread direction in embodiments in which the helical fin 514 is defined by a thread made in or on the surface(s) in or on which the helical fin 514 is to be defined. In the present embodiment, in addition to the pumping action, the helical fin 514 may be used as a lock-in point for a tool that may be used to remove the main shaft portion 502' from a given machine 100, for example by removing the end portion 502" out of the main shaft portion 502' and then threading a threaded male portion of the tool into the helical fin 514 to provide for a securement between the tool and the main shaft portion 502'.

In this embodiment, the liquid pump 504 is operated when the main shaft portion 502' of the shaft 502 is rotated about the rotation axis 510 relative to the end portion 502" of the shaft 502, for example by a motor of the machine 100 (e.g. an APU, an electric generator machine, an aircraft engine, and so on) with which the shaft assembly 500 is used, in a given direction 520. FIG. 5 shows one example of the given direction 520. In other embodiments, the given direction 520 may be in the other direction about the rotation axis 510.

In cases where the shaft assembly 500 is implemented with a machine having a liquid and/or lubrication system 104, such as the APU 100 or the engine 450 described above, the liquid coolant and/or lubrication system 104 may be hydraulically connected to the axial channel 506 via the end portion 502" of the shaft 502, and more particularly in this embodiment via a channel 522 defined through a base 516 and the appendix 508 of the end portion 502" of the shaft 502. In some embodiments, the liquid coolant and/or lubrication system 104 may supply a coolant/lubricant, such as an oil, at a relatively high pressure to the channel 522. In some embodiments, this arrangement may include recirculation which may be similar the recirculation of the example liquid coolant and/or lubrication system 104 described above with reference to the shaft assembly 101 and shown in FIGS. 1 to 3.

In the present case, the liquid coolant and/or lubrication system 104 may be configured such that when so hydraulically connected, during operation of the machine 100, the liquid coolant and/or lubrication system 104 may move a coolant/lubricant, which may be an oil in the case of the machine being the APU 100 or the electric generating machine 100 or the engine 450 as described above for example, through the end portion 502" and the main shaft portion 502' of the shaft 502 as schematically shown with arrows 524 in FIG. 6. To this end, the channel 522 in the end portion 502" may have an inlet opening 522' defined in the base 516 and disposed outside of the axial channel 506, and an outlet opening 522" defined in the appendix 508 and disposed inside the axial channel 506.

As shown, the outlet opening 522" may be at a location that is further inside the axial channel 506 than a location of the bearing 512 inside the axial channel 506. In other embodiments, the outlet opening 522" may otherwise be hydraulically connected to the axial channel 506 so as to bring coolant/lubricant into the axial channel 506 inward of the bearing 512. As such, the liquid coolant and/or lubrication system 104 may move the coolant/lubricant into the axial channel 506 past the bearing 512. From there, the coolant/lubricant may flow through the axial channel 506 to other parts (e.g. to bearings, splines, etc.) of the machine 100 to which the coolant/lubricant can be supplied via the axial channel 506 as described above with regard to the shaft assembly 101.

In some embodiments, and depending on the particular embodiment of the machine 100 with which the shaft assembly 500 is implemented for example, the flow 524 of liquid coolant/lubricant may be in the opposite direction. In such embodiments, the outlet opening 522" of the end portion 502" may be the inlet, and the inlet opening 522' may be the outlet. In either case, the arrangement described above which allows a majority of the flow 524 to bypass the bearing 512 and the gap between the appendix 508 and the helical fin 514, helps reduce centrifugal forces imparted to the coolant/lubricant from rotation of the main shaft portion 502' and/or helps reduce pressure drop in the coolant/lubricant across the shaft assembly 500.

Also, as shown with arrows 526 in FIG. 6, in at least some embodiments, some of the coolant/lubricant may flow from the axial channel 506 through the bearing 512 as a result of pressure inside the axial channel 506. In the present embodiment, the pumping action 514' provided by the helical fin 514 opposes the flow and pressure from inside the axial channel 506 and thereby reduces a flow rate of the coolant/lubricant 526 through the bearing 512.

In some embodiments, the liquid coolant system 104 may be configured to provide a pressure (i.e. may generate a pressure of the liquid) in the axial channel 508 that is sufficient to slightly overcome the pumping action 514' of the helical fin 514 to allow for some of the liquid coolant/lubricant flowing through the axial channel 508 to pass from the axial channel 506 through the bearing 512 toward the helical fin 514 against the pumping action 514' of the helical fin 514. In other words, in some embodiments, the pumping action 514' and a supply of liquid coolant/lubricant from the liquid coolant and/or lubrication system 104 into main shaft portion 502' generate a pressure differential that is selected (e.g. by selecting a pitch, a total fin length, and other characteristics of the helical fin 514 based on each particular embodiment of the liquid coolant and/or lubrication system 104, the bearing 512, etc. using conventional engineering principles for example) to allow some of the liquid coolant/lubricant to flow from the axial channel 508 through the bearing 512 toward the helical fin 514.

In some embodiments, the pressure differential is selected to allow some of the liquid coolant/lubricant to flow from the axial channel 508 through the bearing 512 toward the helical fin 514, but not past the helical fin 514 so as to avoid leakage via the interface between the appendix 508 and the main shaft portion 502' of the shaft 502. In at least some applications, such embodiments allow to reduce and/or eliminate leakages of coolant/lubricant out of the axial channel 506 via the rotational interface between the end portion 502" and the main shaft portion 502' of the shaft 502, while providing for at least some entry of the coolant/lubricant into and/or through the bearing 512 for lubricating the bearing 512.

Now referring to FIGS. 6 and 7, another difference between the shaft assembly 500 and the shaft assembly 101 may be that the base 516 of the end portion 502" defines a cylindrical cavity 528 therein, which partly defines the channel 522. The cavity 528 may be coaxial with the rotation axis 510. In some embodiments, the cavity 528 is sized sufficiently large to allow a filter screen 530 to be installed into the body 516 to filter the flow 524 as it moves from the inlet aperture 522' into the portion of the channel 522 in the appendix 508. The filter screen 530 is inserted into the cavity 528 and is retained therein by a retention mechanism, such as a retaining ring (best shown in FIG. 6, not labeled).

The filter screen 530 helps to remove particles that may be contained in the flow 524 of coolant/lubricant before the flow 524 reaches the axial channel 506. The filter screen 530 thereby helps to provide at least some protection to the bearing 512 and other parts downstream of the appendix 508, against debris that may be present in the flow 524. As shown, in this embodiment, the cavity 528 and the filter screen 530 are sized larger than the part of the channel 522 in the appendix 508 of the end portion 502". This helps reduce a pressure drop in the flow 524 across the shaft assembly 500. However, in other embodiments, the filter screen 530 may be smaller and/or placed in a different location.

In this embodiment, the cavity 528 is sealed with a suitable cover 532 disposed at an outer edge of the base 516 to seal the cavity 528 after the filter screen 530 is installed. It is contemplated that the filter screen 530 may be any suitable filter screen, such as a conventional filter screen. It is also contemplated that in at least some embodiments and/or applications, the cylindrical cavity 528 and/or the filter screen 530 may be omitted.

The rest of the shaft assembly 500 and its possible applications may be similar to the shaft assembly 101 and the possible applications of the shaft assembly 101 as described above. For example, end portion 502" may be configured to be mounted into a frame 102, or a block 102 (such as an engine block) of a machine 100 so as to be movable relative to the main shaft portion 502' of the shaft 502 along the rotation axis 510.

In some embodiments, the end portion 502" is structured to be mounted into the frame/block 102, so as to also be movable relative to the main shaft portion 502' of the shaft 502 out of the rotation axis 510 (i.e. about one or more axis that is angled relative to the rotation axis 510). In one non-limiting example, such movable structuring may include making/machining the aperture 102A in the frame/block 102 that is to receive the end portion 502" therein, slightly larger than an outer diameter of the corresponding part of the end portion 502". Other structures providing a movable interconnection between the end portion 502" and the frame/block 102 as described herein may also be used.

In such embodiments, the in-axis 510 and/or the out-of-axis 510 movement may thus at least in part provided by elastic deformation of the annular seals 300BR or other flexible members disposed on the outer diameter of the corresponding part of the end portion 502" and in contact with the surface(s) of the frame/block 102 defining the aperture 102A that has received therein the corresponding part of the end portion 502". In such a configuration, the end portion 502" may be said to be configured to be "floating" relative to the frame/block 102 and to the main shaft portion 502' of the shaft 502, and thus the mating connection between the end portion 502" and the frame/block 102 may be referred to as a "floating" connection.

In at least some applications, such configurations may help improve performance of the machine 100, such as by accommodating thermal expansions and thermal contractions during operation. Also in at least some applications, such configurations, and particularly floating end portion 502" configurations, allows the end portion 502" to self-center/self-pilot inside the main shaft portion 502' of the shaft 502 when the main shaft portion 502' of the shaft 502 rotates about the rotation axis 510. In at least some applications, such configurations allow the end portion 502" and the main shaft portion 502' of the shaft 502 to be constructed to have tighter clearances therebetween, and to therefore provide for a further improved performance in sealing and pumping, and hence to provide for a further improved performance of the machine 100 with which the shaft assembly 500 is implemented.

The shaft assemblies 101, 462, 500 of the present technology, and the related components and machine(s) in which the shaft assemblies may be used, may be constructed using known materials and manufacturing methods. The above description is meant to be exemplary only, and one skilled in the art will recognize that changes may be made to the embodiments described without departing from the scope of the disclosed technology. For example, in some embodiments, any one of the end portions described above may be shaped and dimensioned to replace, and hence eliminate, a carbon seal that otherwise covers an open end of a rotating shaft of a machine. As another example, in other embodiments the bearing 512 may be a different type of bearing and/or more than one bearing. As another example, in some embodiments, the shaft assembly 500 may allow to eliminate at least one bearing assembly 108 that may otherwise be required with prior art arrangements using carbon seals. Still other modifications which fall within the scope of the present disclosure will be apparent to those skilled in the art, in light of a review of this disclosure.

The invention claimed is:

1. A machine comprising a liquid lubrication system and a shaft, the shaft being rotatable about a rotation axis, the shaft including a first part defining an axial channel therein, a second part engaged coaxially with the first part so as to defined an annular gap therebetween, and a journal bearing inside the axial channel of the first part around the second part, the first part being rotatable relative to the second part about the rotation axis, a helical feature disposed in the annular gap outside the journal bearing between the first part and the second part and configured to define a helical pump between the first part and the second part, the helical pump hydraulically connected to the liquid lubrication system, the journal bearing disposed axially adjacent to the helical feature on an inboard side thereof inside the axial channel of the first part, wherein the machine further comprises a block supporting the first and the second parts of the shaft, and wherein the second part of the shaft is coupled to the block so as to be axially movable relative to the block and to the first part of the shaft along the rotation axis.

2. The machine of claim 1, wherein the second part of the shaft is structured to float relative to the first part of the shaft when the first part of the shaft rotates about the rotation axis.

3. The machine of claim 2, wherein the axial channel has an opening in an end of the first part, the second part is received in the axial channel via the opening, and when the machine operates, the machine drives the first part and the second part relative to one another about the rotation axis , and the helical feature is shaped to generate a pumping action directed toward the journal bearing when the first part rotates relative to the second part about the rotation axis.

4. The machine of claim 2, wherein in operation the machine rotates the first part relative to the second part about the rotation axis in a first direction, and the helical feature has a fin direction that is opposite to the first direction.

5. The machine of claim 4, wherein the second part defines a liquid channel therethrough, the liquid channel hydraulically connecting the liquid lubrication system to the axial channel at a point inside the axial channel on the side of the journal bearing facing away from the helical feature.

6. The machine of claim 5, wherein the second part includes a filter screen disposed in the liquid channel such that lubricant from the liquid lubrication system passes through the filter screen before reaching the axial channel.

7. The machine of claim 6, wherein the second part includes an appendix received in the axial channel of the first part, and a base disposed outside of the first part, the journal bearing is received over the appendix, and the appendix includes a cylindrical outer surface disposed between the journal bearing and the base, and the helical feature is defined by an inner surface of the first part and is positioned over the cylindrical outer surface.

8. The machine of claim 7, wherein the axial channel includes a generally cylindrical outer portion that receives the appendix therein, and a generally cylindrical inner portion extending into the first part of the shaft from the outer portion, and the inner portion is smaller in diameter than the outer portion.

9. A machine comprising:
a motor,
a liquid lubrication system fluidly connected to the motor to lubricate the motor during operation of the motor,
a bearing, and
a shaft including a first part and a second part, the first part having an inner surface defining an axial channel, the second part having an appendix received in the axial channel, the inner surface of the first part and the appendix of the second part defining an annular gap therebetween, the axial channel being hydraulically connected to the liquid lubrication system via the second part, the first part being operatively connected to the motor for rotation by the motor about a rotation axis relative to the second part, a helical feature disposed in the annular gap between the first part and the second part and outside of the bearing to define a helical pump between the first part and the second part, the bearing being disposed radially between the appendix and the inner surface of the first part that defines the axial channel and axially spaced from the helical feature, the helical feature including a helical fin defined by the first part of the shaft, the helical fin having a fin direction that is opposite to the rotation of the first part of the shaft, and wherein the appendix has a smooth cylindrical outer surface that faces the helical fin.

10. The machine of claim 9, wherein the liquid lubrication system is configured to move a liquid lubricant through the axial channel of the first part via a channel in the second part when the machine operates under a pressure sufficient to pass from the axial channel through the bearing toward the helical fin.

11. The machine of claim 10, wherein the bearing is a journal bearing.

12. The machine of claim 9, wherein the second part of the shaft does not rotate about the rotation axis but is movable relative to the first part of the shaft along the rotation axis and/or about at least one axis angled relative to the rotation axis.

13. The machine of claim 12, wherein a filter screen is disposed in the second part to filter flow of the liquid lubricant through the channel in the second part.

14. A method of operating a machine having a liquid system circulating a liquid when the machine is in use, comprising:
rotating a first part of a shaft of the machine about a rotation axis relative to a second part of the shaft, the first and the second parts of the shaft supported by a block, the second part of the shaft coupled to the block so as to be axially movable relative to the block and to the first part of the shaft;
circulating at least some of the liquid through the first part and the second part of the shaft;
passing a flow of the liquid from inside the second part of the shaft into a bearing disposed radially between the first part and the second part of the shaft inside an axial channel defined in the first part; and
generating a pumping action with a helical feature disposed outside of the bearing in an annular gap between the first part and the second part of the shaft to oppose the flow into the bearing.

15. The method of claim 14, wherein the generating the pumping action allows at least some of the flow into the bearing to pass through the bearing.

16. The method of claim 14, comprising generating a pressure differential across the bearing using the pumping action and a pressure of the liquid inside the first part of the shaft, to allow at least some of the flow into the bearing to pass through the bearing.

17. The method of claim 16, wherein the generating the pressure differential includes pressurizing the liquid inside the first part of the shaft with a flow of the liquid from the liquid system.

* * * * *